Patented Dec. 1, 1936

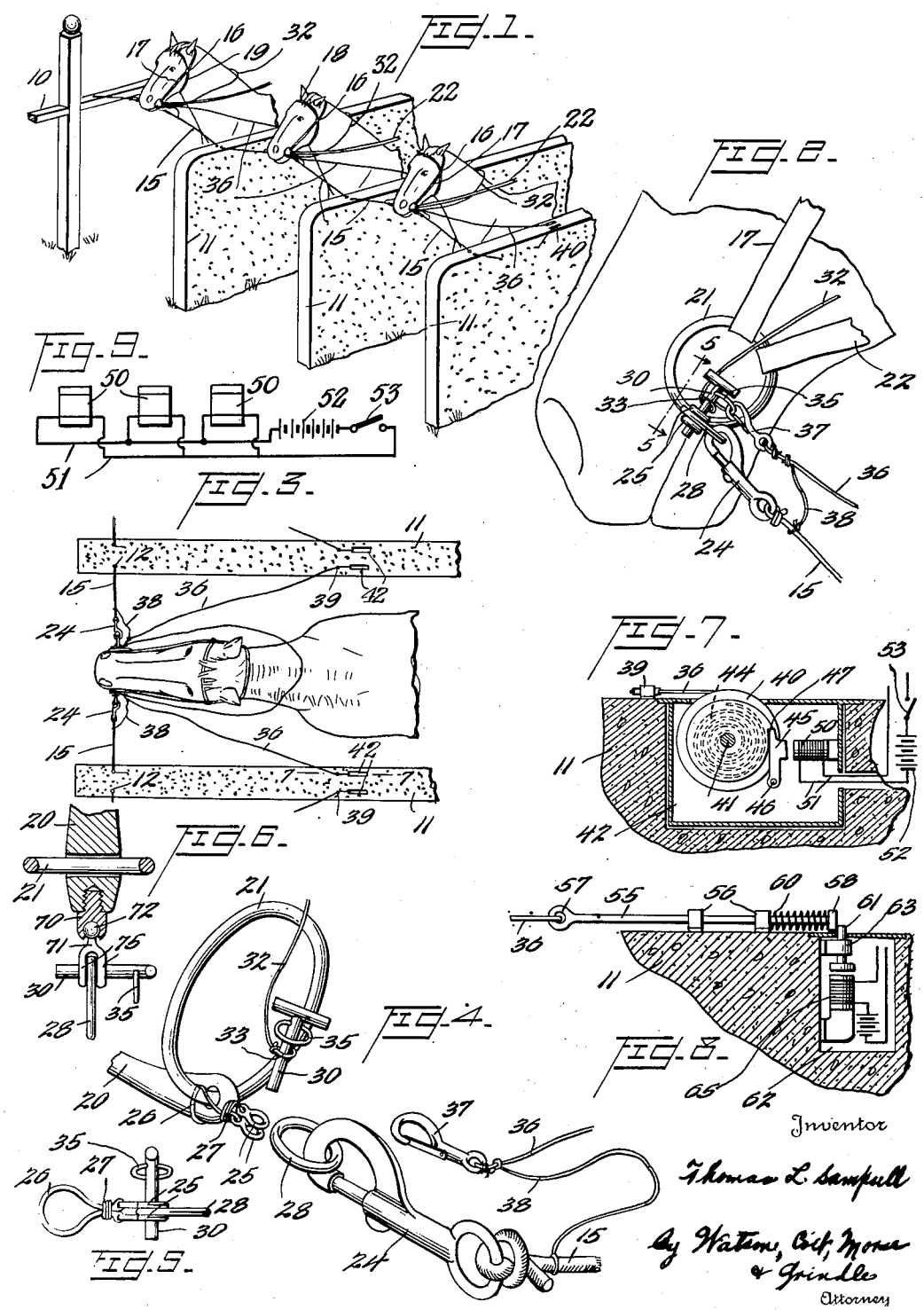

2,062,939

UNITED STATES PATENT OFFICE 2,062,939

RACE STARTING DEVICE

Thomas L. Sampsell, Quantico, Va.

Application April 13, 1934, Serial No. 720,476

8 Claims. (Cl. 119—15.5)

This invention relates to starting devices for horse races and more particularly to the type which is adapted to individually restrain the horses at the starting line and to be readily and quickly released at the instant the race begins.

The general object of the invention is to provide a novel and improved form of race starting device.

Among the prior devices for this general purpose, there have been employed the usual tape barrier which is raised at the instant the race is begun, and also individual stalls for the entrants, which have been either permanently installed on an extension of the race course or have been embodied in a portable machine adapted to be removed from the track after the race has started. All of these prior devices, however, have not proved entirely satisfactory for one reason or another. The simple tape barriers provide no means for separating the horses prior to the start of the race, and even in the case of the individual stalls, fractious animals have been known to leap over or onto the partitions dividing the stalls and have sustained serious harm to themselves or inflicted injury to other contestants.

The present invention, however, aims to provide means for positively connecting the horses to their stalls by attachment to a portion of the harness, this restraining means being capable of quick detachment at the instant the starting signal is given.

Therefore, a more particular object of the invention is to provide a device of this character which, prior to the beginning of a race, serves to individually and positively secure each mount in his proper position, and which may be operated by a starter to simultaneously release all of the horses, or by the several jockeys to release the horses either individually or as nearly simultaneously as the jockeys are able to respond to the starting signal. The individual release, of course, is especially advantageous in case of emergency in which it is desired to release a single horse while retaining the other entrants in proper starting position, and for this purpose, it is obvious that this individual release may be actuated by the jockey, a hostler, an assistant starter or other person who may be stationed near the horse's head.

In its preferred embodiment, the invention contemplates the provision of a series of starting stalls adapted to be either permanently secured to the track or capable of being moved aside after the race has begun; and furthermore, the provision of a halter or like means for securely attaching a mount to the stall structure and preferably being releasably attached to the bit or other portion of the bridle. This releasable connection may be applied in part at the stable or paddock before the horse is led to the starting line, and the halter rope which is preferably permanently secured to the stall partition may be snapped onto this connection when the horse has been placed in the stall. To a portion of the quick-detachable releasing means there is connected an actuating member which is also preferably attached to the stall or other relatively stationary portion of the race course. This actuating means is adapted to be sprung or tripped by an instrumentality which is common to all of the stalls. In this way the starter may actuate the release mechanism of all the horses simultaneously. There is also attached to the releasable halter connection a supplemental actuating means under the control of the individual jockey whereby he may release his own horse separately in case of emergency, or upon the giving of the starting signal in the case of the actual commencement of a race.

Other objects and features of novelty will be apparent from the following specification when read in connection with the accompanying drawing in which certain embodiments of my invention are illustrated by way of example.

In the drawing:

Figure 1 is a fragmentary perspective view showing a portion of the starting line of a race course in which three of the entrants are secured in the starting stalls in the manner provided by my invention;

Figure 2 is an enlarged side view of the muzzle of a horse illustrating the quick-detachable connection of the restraining means;

Figure 3 is a fragmentary plan view of one of the starting stalls in which a horse is secured;

Figure 4 is an exploded or disconnected view of the releasing means;

Figure 5 is a view taken along line 5—5 of Figure 2 but showing the quick-detachable connection separated from the bit;

Figure 6 is a modified construction in which a portion of the quick-detachable means is permanently swivelled to the bit;

Figure 7 is a vertical cross sectional view taken on line 7—7 of Figure 3 illustrating one form of springing or tripping mechanism for releasing the horses;

Figure 8 is a view similar to Figure 7 showing an alternative construction; and

Figure 9 is a diagrammatic view illustrating the electric circuit that actuates the magnets controlling the releasing devices.

In Figure 1 of the drawing, which illustrates a portion of the starting line, several horses are shown disposed in the stalls which are bounded by the rail 10 of the track and the stall partitions 11. These partitions which form the stalls may be either permanently installed on a chute or extension of the track, or may comprise portions of a portable starting machine which is adapted to be temporarily positioned on the main track or oval and removed after the race has begun. In the case of a permanent installation the stall partitions may be made of wood, metal, concrete, or any suitable material. In the embodiment illustrated the partitions are indicated as being constructed of concrete.

Suitably secured to the upper forward portions of the stall partitions 11 as by means of the eyes or rings 12, are the restraining means 15 which may take the form of halter ropes, straps, chains or other flexible elements. Each horse is provided with the usual bridle 16 of the simple type generally applied to race horses and which comprise among other elements, the cheek pieces 17, the fronts 18, the throat latches 19, the bits 20 (together with their rings 21), and the snaffle reins 22.

As clearly shown in the drawing, each horse is restrained by means of two of the elements 15 secured to the adjacent stall partitions 11 and provided with snap hooks 24 which are connected in the illustrated embodiment with each end of the bit 20 by means of the releasable connection which will now be described.

A pair of small rings or eyes 25 are connected together by a short flexible element 26 which may be a leather thong, a strong cord or similar device. This flexible element 26 is of only sufficient length to be wound about the end of the bit and a portion of the bit ring 21 so that the eyes 25 may project somewhat stiffly outwardly beyond the end of the bit 20. Any suitable means for securing the rings in overlapping position as shown in Figures 2, 4 and 5 may be provided such as the strand or rubber band 27 which is wound in a number of turns around the ends of the loop 26 closely adjacent the shanks of the eyes 25. It will be seen that by this or other similar means, the two eyes 25 and their connecting element are stiffened to a certain degree so that they will remain approximately in the position in which they are initially placed and which is clearly illustrated in Figures 2 and 4. The perforations of the eyes 25 are aligned in a substantially vertical or very slightly inclined position and are adapted to receive between them the ring 28 which is retained in releasable position by means of the cotter pin 30 which is preferably headed or T-shaped to prevent accidental removal from its applied position. As will be clearly understood from the drawing, the pin 30 passes through the eyes 25 and the ring 28 and will hold the restraining means 15 securely attached to the horse's bridle even though the horse should toss his head and thus change the angle of the pin 30 to some degree from the vertical.

It should be mentioned that the ring 28 may be applied to the bridle by means of the pin 30 at the stable or the paddock before the horse is led to the starting stall. A supplemental rein 32 is provided with loops 33 in each end thereof which are applied to the shanks of the pins 30 between the pairs of eyes 25 and the heads of the pins. This rein is also applied at the stable before bringing out the horses, and is for the purpose of enabling the jockey or an attendant in the immediate vicinity of the horse to release the animal.

Upon the arrival at the stall the snap hooks 24 at the ends of the restraining ropes 15 are connected to the rings 28 on either side of the horse. At this time the actuating means for the release pin 30 are also connected as will now be described.

A ring or other suitable attaching element 35 is disposed upon the shank of the release pin 30 near the head thereof and above the supplemental rein loops 33. A cord 36 is provided at one end with a snap hook 37 which is adapted to be connected to the ring 35 on the release pin. The other end of the release actuating cord 36 is secured to mechanism associated with the starting stalls by which the cords may be given a sudden rearward jerk in a substantially horizontal direction in order to pull the pin 30 out of the eyes 25 and the ring 28 and thus release the restraining connection. A slack cord or strand 38 serves to connect the restraining halter rope 15 and the end of the actuating cord 36, whereby the ends of the respective restraining and release means may be more readily grasped in applying the device, and also whereby the rearward movement of the release cord 36, if continued after the pin has been withdrawn, will retain the halter rope 15 alongside of or on top of the stall partition in readiness for application before the next race.

The simultaneously actuated means for jerking the cord 36 rearwardly may take any convenient form, but two preferred embodiments are shown in Figures 7 and 8 of the drawing. In Figure 7, the cord 36 is passed through a guide 39 and wound upon a reel 40 which is adapted to rotate upon a shaft 41 which is secured at its ends in the walls of a casing 42 set in either the upper or side walls of the partition 11. A spiral spring 44 is secured at its ends to the shaft 41 and the drum or reel 40 respectively. It will be understood that when the cord 36 is pulled out to be applied to the releasable restraining device the reel 40 is wound up against the tension of the spring 44 and is eventually retained by means of the latch 45 which is pivoted as at 46 and engages the tooth 47 suitably associated with the reel 40. The latch 45 is adapted to be released by means of the electromagnet 50 which is energized by the circuit comprising the wires 51, the source of current 52 and the switch 53. The magnets 50 associated with all of the starting devices are designed to be placed in this same circuit whereby they may release the restraining mechanisms upon the closing of a single switch 53 which may be under the control of the starter. It will thus be readily perceived that upon energizing the magnet 50 the latch 45 will be released from the tooth 47 and the reel 40 will be suddenly rotated by means of the spring 44 and the release cord 36 will be jerked rearwardly and wound upon the reel so as to pull the pin 30 and detach the restraining device from the horse.

It should be here stated that a certain amount of slack or play may be permitted in the restraining member 15 which would permit a very limited movement of the horse's head in a horizontal plane. Therefore, enough slack in the actuating cords 36 must be permitted to prevent the accidental removal of the pin 30 by such movement of the head of the horse.

An alternative simultaneously operated release device is shown in Figure 8 and comprises the rearwardly movable rod or bolt 55 which is guided in the members 56 carried by a suitable surface of the partition 11. The cord 36 is secured to the forward end of the rod 55 as at 57 and a head 58 is provided at the rear end of the bolt or rod. Between the head 58 and one of the members 56 is disposed a spring 60 which is adapted to be compressed to urge the bolt 55 in a rearward direction. In order to retain the bolt in its set position a latch element 61 is disposed within a recess 62 provided in the wall of the partition 11, is guided in the member 63, and is adapted to be retracted by means of the electromagnet 65. All of the electromagnets 65 associated with the starting mechanism may be electrically energized as described with reference to the embodiment shown in Figure 7.

An alternative form of release mechanism for the restraining halter is illustrated in Figure 6. In this embodiment a portion of the detachable connection is permanently associated with the bit 20 and may comprise the female swivel pin 70 which is associated with the bifurcated swivelling member 71 provided at one end with a ball 72 and at the other with the aligned eyes 75, these latter elements corresponding to the eyes 25 in the first embodiment. The ring 28 is adapted to be inserted between the eyes 75 and retained in position by the release pin 30. The operation of the release device is exactly the same as in the earlier described embodiment and it will be understood that the ball and socket connection 70, 72 will permit the necessary swivelling of the connection to permit withdrawal of the pin in a substantially horizontal direction.

It will be readily understood that when the cords 36 of the simultaneous starter operating release means are pulled, the pin 30 is not only removed from the quick-detachable restraining connection, but also is jerked out of the loops 33 in the supplemental reins 32. When these reins are thus released from the connection they may be ignored or discarded by the jockey as he sees fit.

It will be understood from the foregoing detailed description that there is provided by means of this invention a starting mechanism which embodies stalls within which the horses are disposed and also positive securing means for insuring that the horses are properly and safely aligned and restrained within the stalls at the beginning of the race. Furthermore, novel means are provided by which these restraining devices may be instantaneously disconnected either simultaneously by the official starter or individually or simultaneously by the jockeys themselves.

It should be further understood that various changes and modifications may be made in the embodiments illustrated and described herein without departing from the scope of the invention as defined in the subjoined claims; and that all terms used herein should be interpreted generically and not in any limiting sense; for example, the principles of the invention may be applied to restraining other animals than horses and may be employed in other connections than races or speed tests.

Having thus described the invention, what is claimed as new and desired to be secured by Letters Patent is:

1. In a starting device for horse races, in combination, restraining means for the horses, and alternative means adapted to be actuated by the jockeys and by a common starter respectively to release said restraining means.

2. In a starting device for horse races, in combination, individual restraining means for the horses, release means for disconnecting said restraining means, means adapted to be operated by the individual jockeys for actuating the release means of their respective mounts, and other means adapted to be simultaneously operated as by a starter to actuate said release means.

3. In a starting device for horse races, in combination, individual restraining means adapted to be connected to the bridle of each horse, release means for disconnecting said restraining means from the bridle, means adapted to be operated by the individual jockeys for actuating the release means of their respective mounts, and other means adapted to be simultaneously operated as by a starter to actuate said release means.

4. In a starting device for horse races, in combination, two restraining means for each horse, one restraining means being attached at one of its ends to a portion of one side of the bridle of the horse and at its other end to a relatively permanent part of the race course, the other restraining means being attached at one end to a portion of the other side of the bridle and at its other end to a relatively permanent part of the race course, release means for said restraining means, means operable from the race course for simultaneously actuating all of said release means, and means operable by the jockeys to actuate the release means of their mounts individually.

5. In a starting device for horse races, in combination, a series of stalls, restraining means connecting the horses to said stalls, means for releasing all of said restraining means simultaneously from the horses, and means whereby each jockey may release his mount from said restraining means individually.

6. In a starting device for horse races, in combination, a series of stalls, restraining means secured to the walls of each of said stalls, quick-detachable devices connecting said restraining means to the bridles of the horses, means connected to said stalls for releasing said quick-detachable devices and adapted to be actuated by a common starter, and additional means for releasing said quick-detachable devices adapted to be actuated by the jockeys individually.

7. In a starting device for horse races, in combination, a series of stalls, restraining means connecting the bridle of each horse with an adjacent portion of a stall, cooperative means on each bridle and said restraining means, a pin adapted to be passed through each of said cooperating means to secure each bridle to said restraining means, a connection from each of said pins to a release mechanism disposed on said stall, and an additional connection from each of said pins adapted to be actuated by a jockey.

8. A quick-detachable connection for securing animals or the like comprising, in combination, a bit, a pair of eyes, pliant means securing said eyes to one end of said bit in alignment, a ring disposed between said eyes, a headed release pin passing through said ring and said eyes, and means for withdrawing said pin.

THOMAS L. SAMPSELL.